(12) United States Patent
Westerkull

(10) Patent No.: US 7,021,676 B2
(45) Date of Patent: Apr. 4, 2006

(54) CONNECTOR SYSTEM

(76) Inventor: Patrik Westerkull, Hovås hagstig 26 A, SE-43654 Hovas (SE)

( * ) Notice: Subject to any disclaimer, the term of this patent is extended or adjusted under 35 U.S.C. 154(b) by 0 days.

(21) Appl. No.: 10/842,315

(22) Filed: May 10, 2004

(65) Prior Publication Data

US 2005/0248158 A1 Nov. 10, 2005

(51) Int. Cl.
*F16L 39/00* (2006.01)

(52) U.S. Cl. ............... 285/321; 285/307; 285/415; 600/25

(58) Field of Classification Search ........... 285/321, 285/413–415, 307; 600/25
See application file for complete search history.

(56) References Cited

U.S. PATENT DOCUMENTS

| | | | | |
|---|---|---|---|---|
| 2,913,261 A | * | 11/1959 | Matchett | 285/321 |
| 3,144,262 A | * | 8/1964 | Reynolds | 285/321 |
| 3,813,065 A | * | 5/1974 | Hallesy et al. | 285/321 |
| 4,498,461 A | * | 2/1985 | Hakansson | 600/25 |
| 4,717,048 A | * | 1/1988 | Stenger | 285/415 |
| 4,904,233 A | * | 2/1990 | Høkansson et al. | 600/25 |
| 5,022,687 A | * | 6/1991 | Ariga | 285/321 |
| 5,149,143 A | * | 9/1992 | Howell | 285/414 |
| 5,735,790 A | | 4/1998 | Hakansson | |
| 2004/0210103 A1 | | 10/2004 | Westerkull | |

FOREIGN PATENT DOCUMENTS

SE 8903271 5/1992

* cited by examiner

*Primary Examiner*—Aaron Dunwoody
(74) *Attorney, Agent, or Firm*—Rolf Fasth; Fasth Law Offices

(57) ABSTRACT

A connector system for interconnecting a hearing aid (3) with a fixture (5) anchored in a bone segment (7). An abutment (9) has a contact surface (21) with is a substantially circular surface. A connector plate (17) with a substantially circular connector contact surface (20) is in contact with the abutment contact surface (21) when the hearing aid (3) is connected to the abutment (9). The abutment (9) has a wide abutment coupling area and a narrow portion. The abutment coupling area is enclosable by coupling shoes (15). The coupling shoes (15) exert a pressure against the abutment coupling area disposed on a mantle surface (25) of the abutment. The coupling shoes are movable in a radial direction relative to the connector plate (17). The coupling area has an increasing diameter in a lateral direction (L). A coupling area (29) of the coupling shoes has an increasing diameter in the lateral direction (L) to exert a pressure on the abutment (9) against a connector contact surface when the coupling shoes (15) are pressed in the radial direction against the abutment (9).

12 Claims, 5 Drawing Sheets

CONNECTOR SYSTEM

TECHNICAL FIELD

The present invention relates to a connector system for interconnecting a bone anchored implant with a bone conduction hearing aid.

BACKGROUND OF THE INVENTION

Bone anchored hearing aids are essential for the rehabilitation of patients suffering from some specific type of hearing losses for which traditional hearing aids are insufficient. This type of device consists of an external hearing aid with a vibrating transducer which is connected via a connector to a skin penetrating abutment mounted on a fixture anchored in the skull bone. The abutment can be mounted on the fixture with a small screw going through the centre of the abutment and into a threaded hole in the fixture. It is important that the coupling between the hearing aid and the abutment is sufficiently firm to avoid poor transmission of the vibrations but it is also important that the coupling is not too firm since it is also important that the hearing aid falls off in case of a sudden impact to avoid that the skull bone anchoring is damaged. The patient takes on and off the hearing aid daily so wear and tear durability of the coupling is important.

One type of an interconnecting coupling between the hearing aid and the abutment is described in U.S. Pat No. 5,735,790. A drawback with this design is that it is difficult to change the coupling part on the hearing aid when this is worn out. Significant costs and problems for the patients are caused by the fact that the device needs to be sent in to a special hearing aid repair centre to change the coupling part on the hearing aid. Another drawback with that design is that it is difficult to get a constant coupling force during the life time of the coupling since there is no reliable metal spring which determines the coupling force and which is more stable during long term use. Since the invention described in U.S. Pat. No. 5,735,790 does not include any easy removable coupling spring it is also not easy to modify the coupling force for individual fitting of a suitable coupling force for different patients. It is for example desirable to have a lower coupling force on a young child who has a softer skull bone that on an adult patient. The invention described in U.S. Pat. No. 5,735,790 includes a flexible coupling part going inside of the abutment which is a design which can limit the size of the conical entering of the coupling which is necessary to make it easy for especially elderly patients to find the way into the coupling when the hearing aid is connected to the abutment. The invention described in SE 89032718 had flexible coupling arms which extended along the centre axis of the coupling over a ball shaped part representing a significant portion of the abutment length which increased the risk for the flexible coupling to interfere with the skin around the other end on the abutment. The invention described in SE 89032718 had no separate spring arrangement so it is difficult to change the coupling part on the hearing aid and the invention therefore also includes several of the drawbacks described for in U.S. Pat. No. 5,735,790. Both of these inventions also have flexible arms in the axial direction and where the flexible arms include slots in the axial direction where the abutment or something else can get into the slots and damage the spring arrangement. An arrangement intended to hinder such damage is likely to increase the collection of dirt in the coupling. The invention described in U.S. Pat. No. 4,498, 461 is a bayonet coupling which is a design with several drawbacks since it includes wear and tear parts mounted into the abutment on patient instead of mounted on the easy removable hearing aid part of the system. This design also results in a very varying coupling force during the life time of the device. A design like the one described in SE0102207 has several drawbacks since it includes magnetic components which are not compatible with MRI equipment used at hospitals and a small magnetic circuit can not generate the force needed to keep the hearing aid properly in place. A connector system can include a connector mounted directly on the hearing aid or a connector on any kind of separatable interconnection unit which can be connected in between the connector on the hearing aid and the abutment.

SUMMARY OF THE INVENTION

The connector system of the present invention provides an effective solution to the above-outlined problems with the conventional designs of bone anchored hearing aid couplings. The connector system of the present invention has a flexible coupling substantially working on the outside of the abutment. It has a circular planar contact surface with a wide diameter which makes the coupling stable but where the hearing aid can still be rotated around the coupling which can be important from an aesthetic point of view. The coupling shoes are pressed against the outer mantle surface of the abutment in a conical arrangement so that the connector plate is pressed against the abutment at the contact surface. In this way a safe and reliable connection is achieved. Since the coupling shoes and the spring are moving in radial direction and the spring is circular around the centre axis of the coupling, only a small portion of the length of the abutment needs to be enclosed by the coupling shoes, which minimizes the risk of the coupling shoes being in contact with the skin around the other end of the abutment. Therefore the coupling shoes extends over preferrably less than 50% of the total length of the abutment in axial direction when the hearing aid is connected to the abutment. The extension of the coupling shoes over the abutment is defined as the distance in axial direction from the lateral end of the abutment to the contra lateral end of the coupling shoes when the hearing aid is connected to the abutment. If the spring extends substantially circular around the centre axis of the coupling without any significant spring arm extension in the axial direction a low profile of the whole connection can be designed. A low profile of the connection is important from both safety and aesthetic aspects.

The coupling shoes can be pressed against the abutment by a separate circular spring, for example a metal spring.

In a preferred embodiment the metal spring is mounted in a grove on the outside of the coupling shoes which makes it easy to remove and replace the spring. When the spring has been removed also the coupling shoes can be removed and replaced. This gives a high flexibility of the system and allows also significant cost savings. An important flexibility is that that a spring with suitable stiffness can be chosen for each individual patient which can increase patient safety since it is important that the hearing aid falls off in case of a sudden impact to avoid damaging the fixture in the skull bone. On the other hand it is important to choose as firm coupling as possible for patients wearing a powerful bone anchored hearing aid where it is important that the coupling can transmit significant vibration levels. Another advantage with a steel spring arrangement is that this type of spring has a quite constant spring force during long term use compared with an elastic plastic material acting as a spring. A significant cost saving with this arrangement is that the coupling shoes, which are preferably made of a softer material than the abutment, to minimize the wear on the abutment, can easily be changed when these have been worn out or damaged. The design can include more than two coupling shoes.

In a preferred embodiment the connector plate has a compression limitation surface hindering the coupling shoes from moving more far to the centre in such a way that the connection can enter and easily be pressed on to the abutment. This is an improvement compared to a more basic design where the coupling shoes goes against each other which might result in hair from the patient being stuck between the coupling shoes since the coupling shoes are more visible than the connector plate.

In a preferred embodiment the contact surface of the connector plate can be made of a plastic or ceramic material to ensure that the abutment is electrically insulated from the hearing aid electronics.

In one preferred embodiment a release surface is positioned above the contact surface of the connector plate thus entering inside of the abutment which helps centering the connector plate on the abutment and helps pushing the connector plate away from the abutment when the hearing aid is moved sidewise in relation to the abutment in for example a release situation.

In a preferred embodiment the coupling shoes and the connector plate is manufactured in one piece of an elastic material such as a plastic material which can in itself act as a spring. Such a plastic material can be reinforced by including other materials such as metal components, carbon fiber or glass fiber.

In a preferred embodiment the abutment coupling area on the abutment outer mantle surface is a conical surface with a conical angle of at least 20 degrees which will ensure that a sufficiently large portion of the radial force will be used for pressing the abutment against the connector plate which is important to ensure a distortion free sound transmission.

DETAILED DESCRIPTION OF A PREFERRED EMBODIMENT

Figure 1:
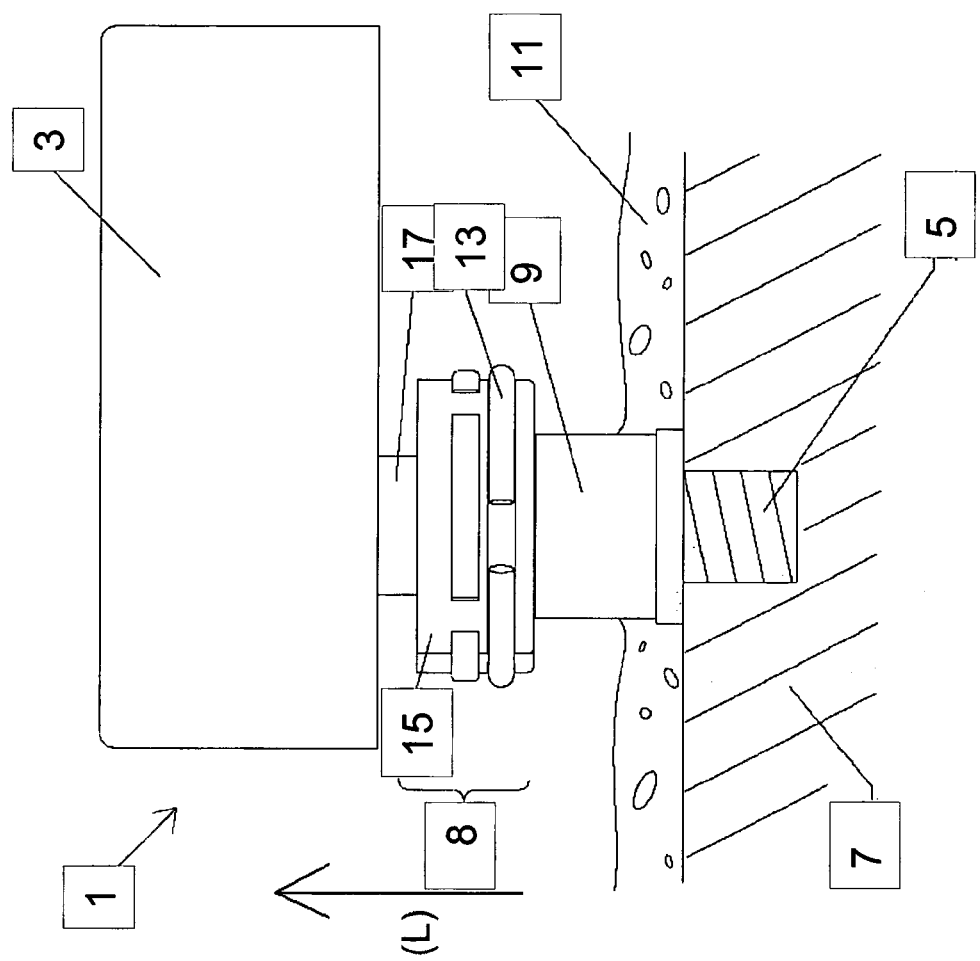
FIG. 1 is a side view of a preferred embodiment of the connector of the present invention when the hearing aid is connected to the skull.
Figure 2:
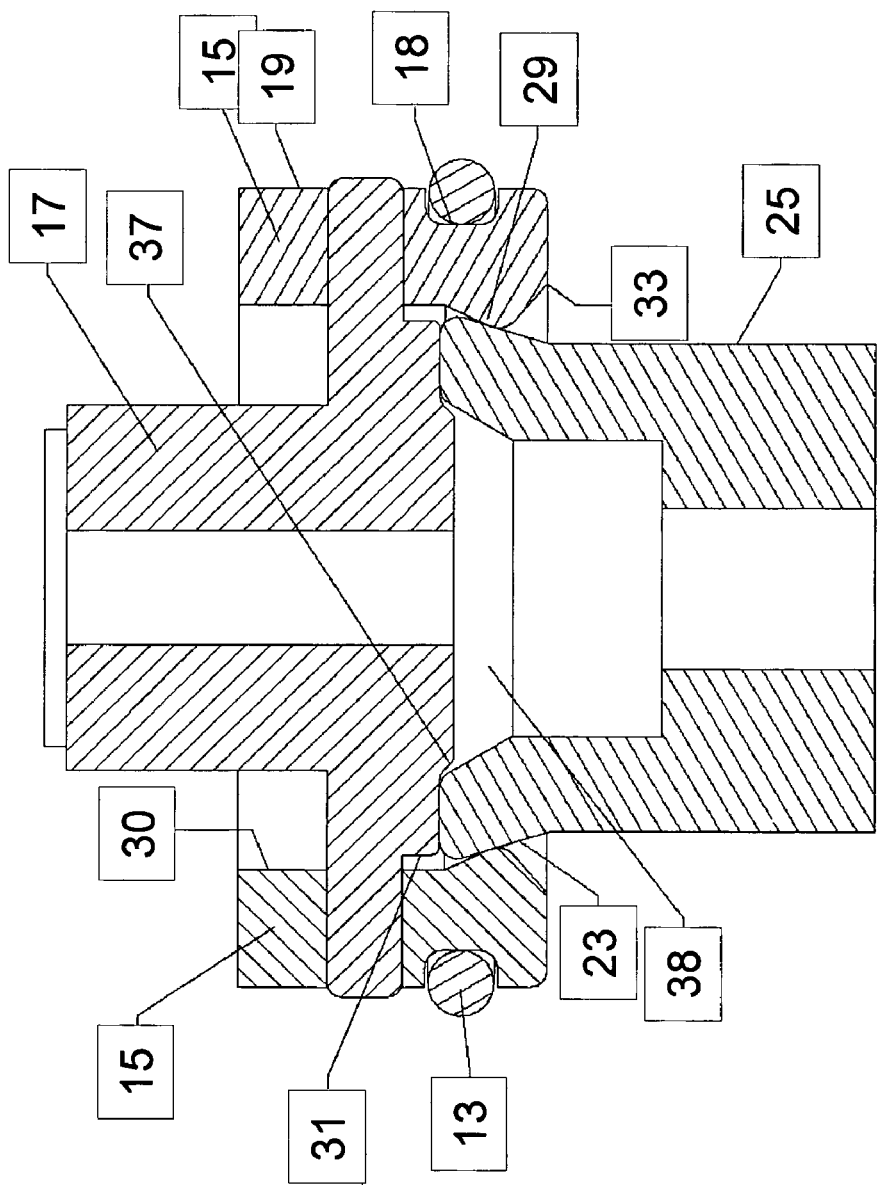
FIG. 2 is a cross-sectional side view of the connector when the connector is connected to the abutment.

In FIG. 1, a preferred embodiment of a connector system 1 for interconnecting a hearing aid 3 with a fixture 5 anchored in the skull bone 7 is shown. A connector 8 is on one side in operative engagement with an abutment 9 which is mounted on the fixture 5 and which goes through the skin 11. The other opposite side of the connector 8 is in operative engagement with a connector plate 17 that is connected to the hearing aid 3. The connector 8 includes a circular metal spring 13 and two coupling shoes 15 mounted on the connector plate 17. The spring 13 is removably attached to a groove 18 defined on an outside surface 19 of the shoes 15. In FIG. 2 the connector plate 17 has a circular connector contact surface 20 that is in contact with a contact surface 21 of the abutment 9. An abutment coupling area 23 on an outer mantle surface 25 of the abutment 9 is conical with a conical angle 27 relative to a centre axis of the abutment and has an increasing diameter in a lateral direction (L). A coupling area 29 protruding inwardly on an inside 30 of the coupling shoes 15 is also conical with a greater diameter in the lateral direction. In this way, the abutment 9 may be pressed into and against the connector plate 17 when the spring 13 presses the coupling shoes 15 inwardly against the abutment 9 so that the coupling area 23 of the abutment 9 may be snapped into the coupling area 29 of the connector. The contact surface has a diameter (d1) and the opposite coupling areas 29 are separated by a diameter distance (d2) so that the diameter (d1) is greater than the diameter (d2) when the hearing aid 3 is not connected to the abutment 9. In order to snap in the abutment, the coupling areas 29 must be separated against a biasing force of the spring 13. The conical shape of the coupling area 23 in combination with the inwardly protruding coupling area 29 prevents the abutment from disengaging from the connector 8. However, the abutment 9 may be disconnected from the connector 8 by again biasing the shoes 15 against the inward biasing force of the spring 13.

Figure 3:
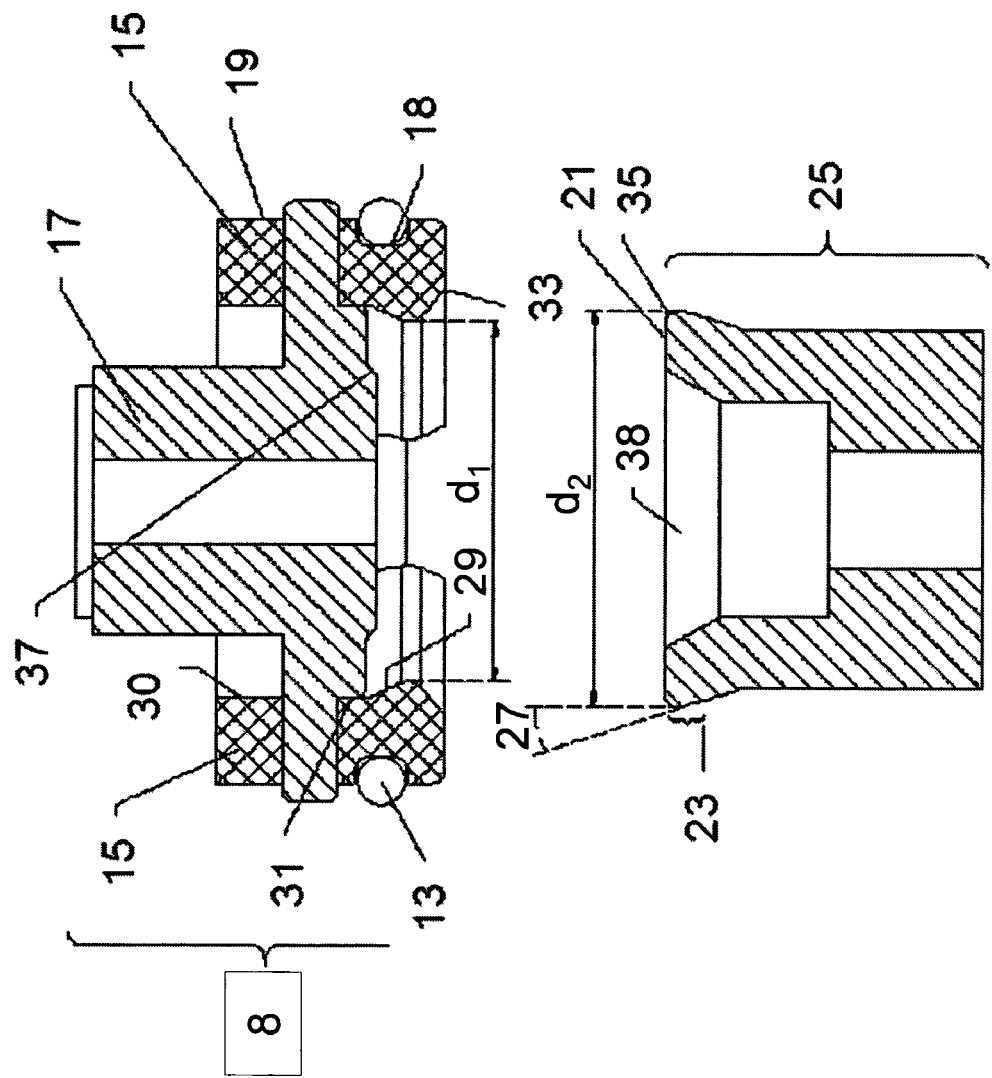
FIG. 3 is a cross-sectional side view of the connector when the connector is disconnected from the abutment.

In FIG. 3, the coupling shoes 15 are pressed inwardly by the spring 13 against the biasing compression limitation surface 31 of the connector plate 17 to prevent the coupling shoes 15 from moving too far inwardly to the center. The diameter of the entering edge 33 of the coupling shoes 15 is preferably always greater than the diameter of the abutment entering edge 35.

Figure 4:
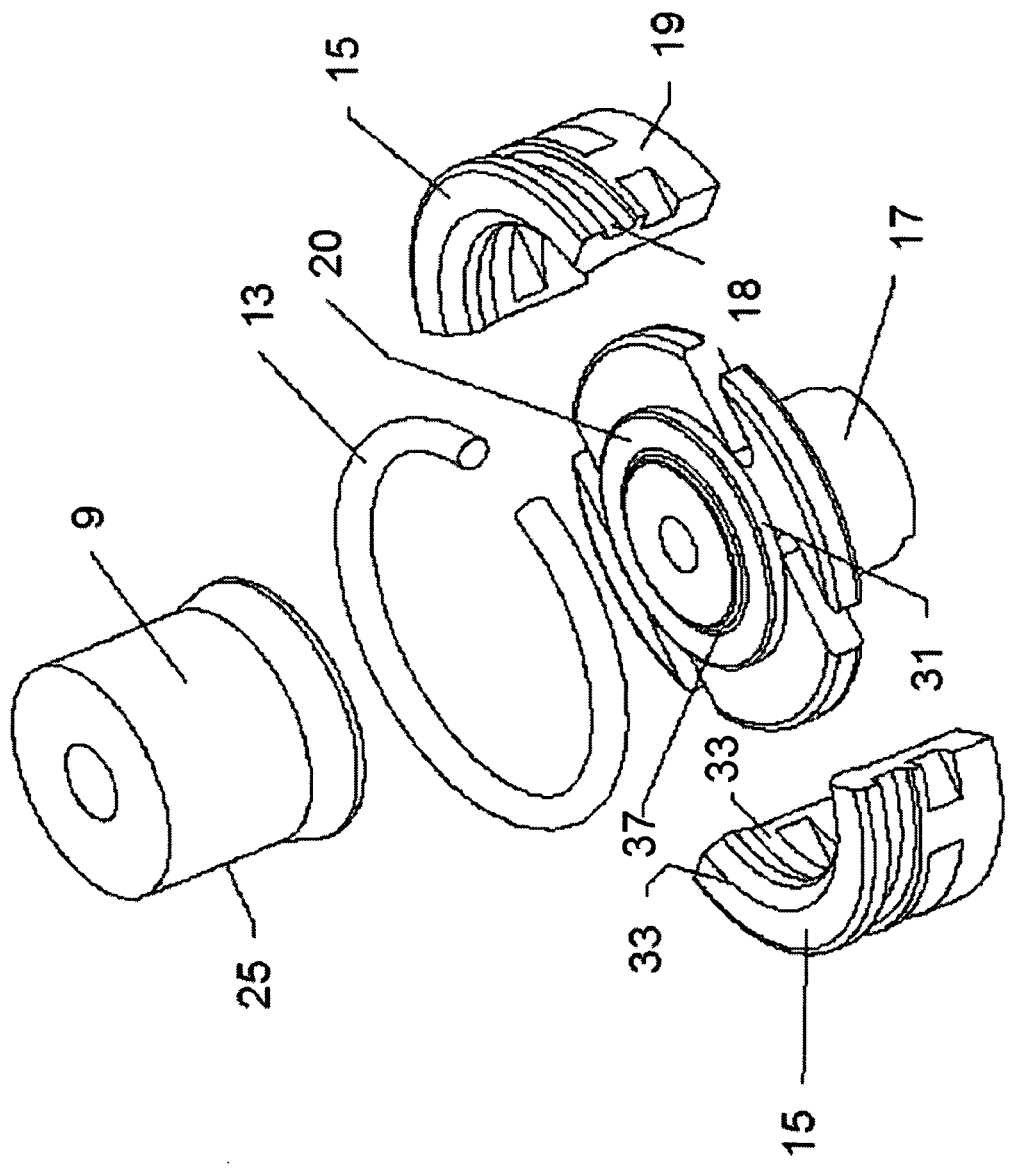
FIG. 4 is an exploded perspective view of the connection shown in FIG. 2.

In FIG. 4, a conical release surface 37 on the connector plate 17 is shown. The conical release surface 37 engages a cavity 38 of the abutment 9, best shown in FIG. 2, and contributes to centering the connector plate 17 on the abutment 9 and pushes the connector plate 17 away from the abutment 9 when the connector plate 17 is moved sidewise relative to the abutment 9.

Figure 5:
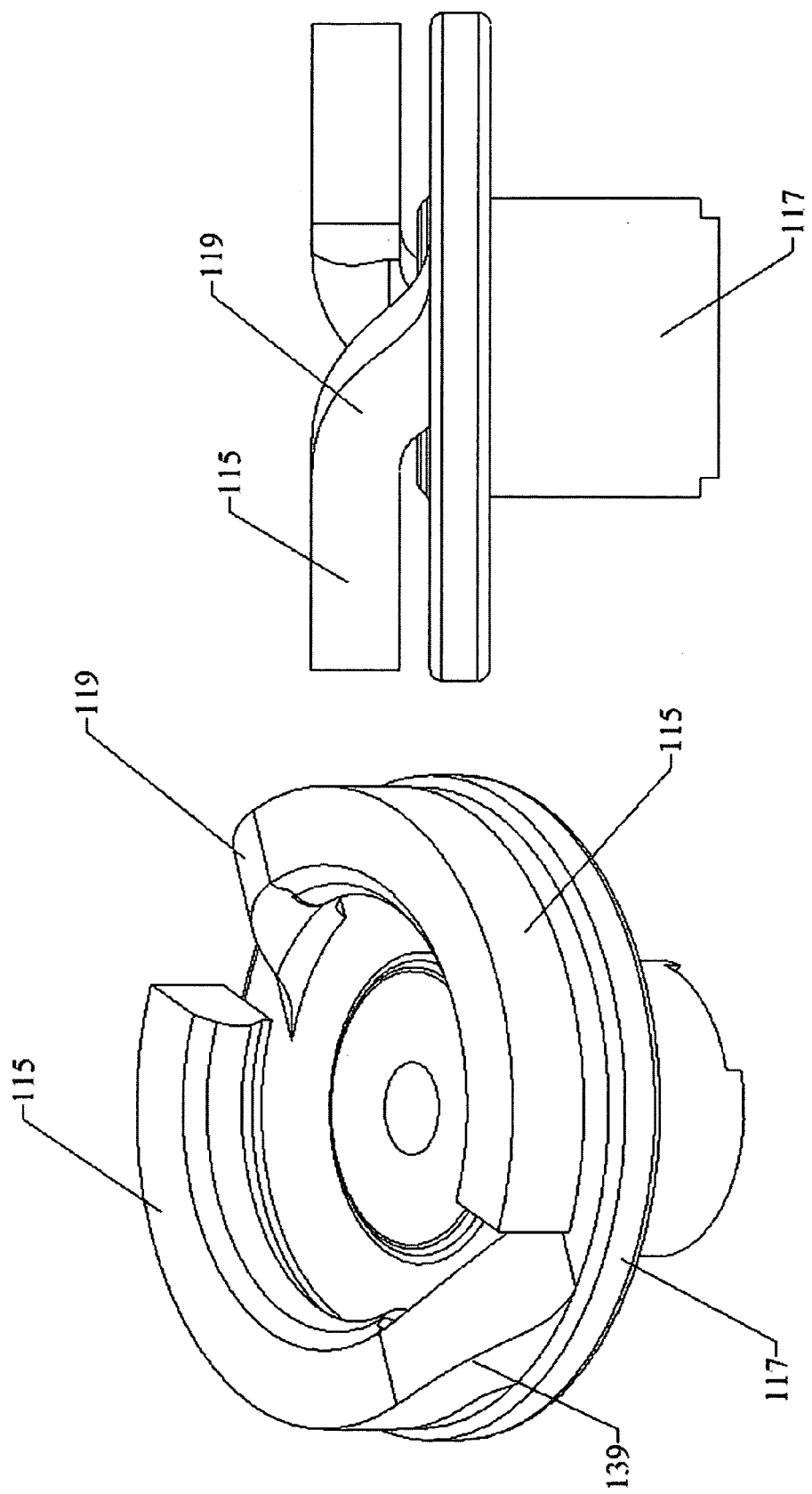
FIG. 5 is a perspective view of a second embodiment of the connector of the present invention wherein the connector plate and the coupling shoes are made in one piece.

FIG. 5 shows an alternative embodiment where coupling shoes 115 and a connector plate 117 are manufactured in one piece with a spring portion 139 connecting the coupling shoes 115 and the connector plate 117.

While the present invention has been described in accordance with preferred compositions and embodiments, it is to be understood that certain substitutions and alterations may be made thereto without departing from the spirit and scope of the following claims.

The invention claimed is:

1. A connector system for interconnecting a hearing aid with a fixture anchored in a bone segment, comprising:
    a fixture anchored in a bone segment;
    an abutment mounted on the fixture;
    a connector having a connector flange extending radially outwardly, the connector having one end being in operative engagement with the abutment, the connector having an opposite end in operative engagement with a hearing aid;
    a coupling shoe having an opening defined therein for receiving and slidably engaging the connector flange, the opening extending through a sidewall of the coupling shoe;
    spring biasing means in operative engagement with the coupling shoe for biasing the coupling shoe radially inwardly, the coupling shoe being openable against a biasing force of the spring biasing means to permit the connector flange to slide into the opening of the coupling shoe; and the coupling shoe having a coupling area, the coupling area having an abutment receiving opening defined therein, the abutment being insertable into the abutment receiving opening.

2. The connector system according to claim 1 wherein the abutment has abutment contact surface that is substantially planar in an axial plane and the connector has a connector contact surface that is substantially planar in the axial plane.

3. The connector system according to claim 2 wherein the abutment contact surface is placed at a peripheral of a lateral end of the abutment.

4. The connector system according to claim 1 wherein the coupling shoe is pressed against an outer surface of the abutment by the spring.

5. The connector system according to claim 4 wherein the spring is mounted in a grove on an outside of the coupling shoe to keep the coupling shoe in place so that the coupling shoe is removable by first removing the spring from the groove.

6. The connector system according to claim 1 wherein the coupling shoe includes a plastic material.

7. The connector system according to claim 1 wherein the coupling shoe extends over less than half of a total length of the abutment when the hearing aid is connected to the abutment.

8. The connector system according to claim 1 wherein an inward movement of the coupling shoe is stopped by a radial compression limitation surface so that a diameter of an abutment entering edge is smaller than a diameter of a coupling shoe entering edge.

9. The connector system according to claim 2 wherein the connector contact surface is made of a non-conductive material.

10. The connector system according to claim 2 wherein the connector has a connector plate that has a substantially conical release surface positioned above the connector contact surface.

11. The connector system according to claim 1 wherein a coupling area of the abutment has a conical surface with a conical angle of at least 20 degrees.

12. The connector system according to claim 1 wherein the spring extends substantially around a center axis of the connector.

* * * * *